(No Model.) 2 Sheets—Sheet 1.
P. RYAN.
STARTER'S GATE FOR RACE TRACKS.
No. 553,740. Patented Jan. 28, 1896.
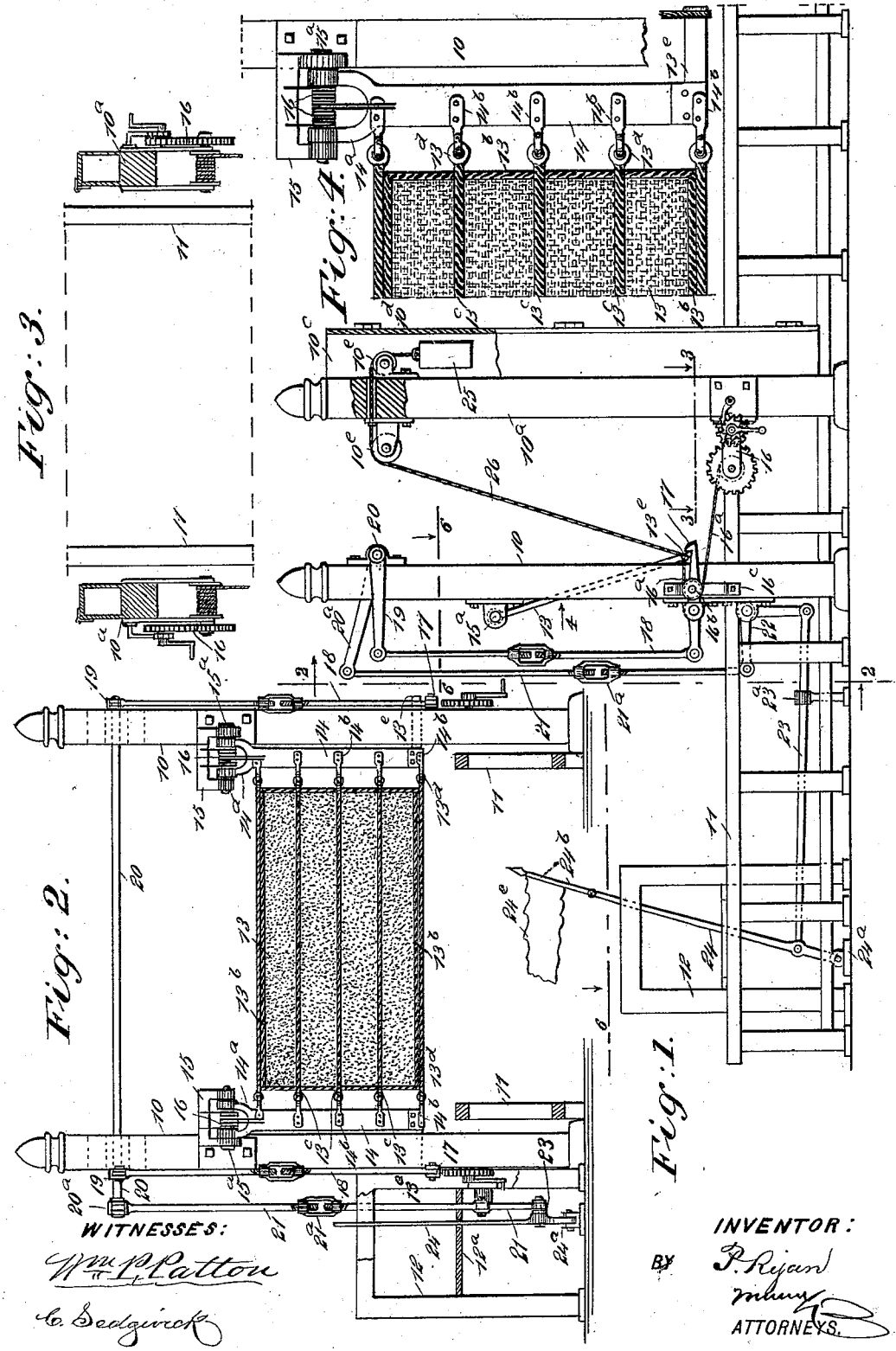
WITNESSES:
Wm P. Patton
C. Sedgwick
INVENTOR:
BY P. Ryan
ATTORNEYS.

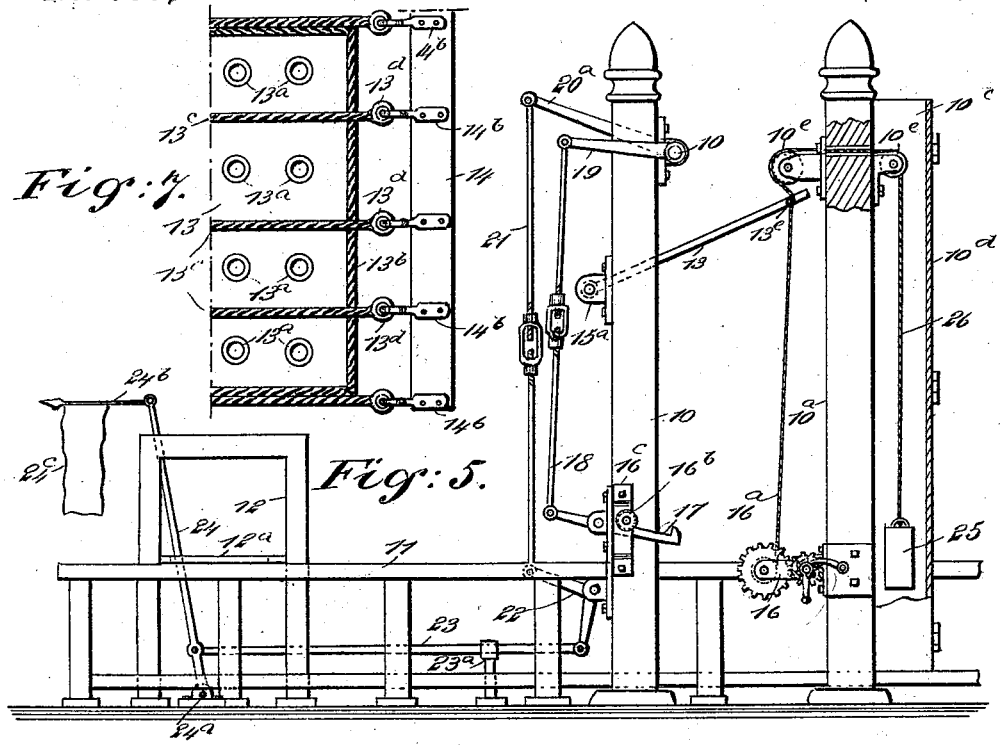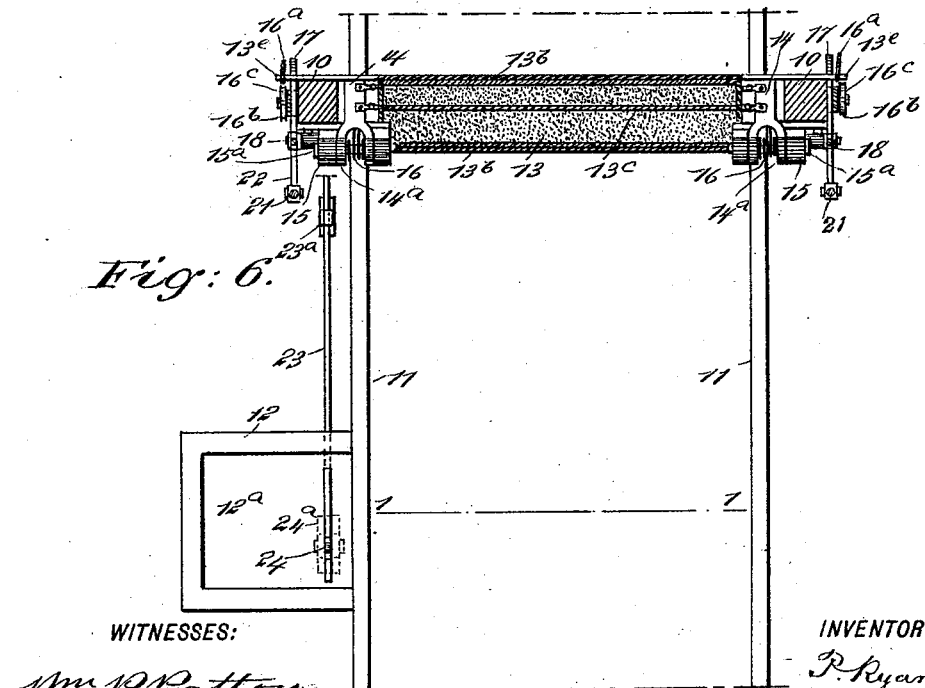

UNITED STATES PATENT OFFICE.

PATRICK RYAN, OF NEW YORK, N. Y., ASSIGNOR OF ONE-HALF TO WILLIAM H. KELLY, OF SAME PLACE.

STARTER'S GATE FOR RACE-TRACKS.

SPECIFICATION forming part of Letters Patent No. 553,740, dated January 28, 1896.

Application filed January 3, 1895. Serial No. 533,722. (No model.)

*To all whom it may concern:*

Be it known that I, PATRICK RYAN, of New York city, in the county and State of New York, have invented a new and Improved Starter's Gate for Race-Tracks, of which the following is a full, clear, and exact description.

This invention relates to an improved device for the use of a starter on race-tracks to facilitate the correct starting of horses in a race.

Usually the official starter or person who has control of jockeys and horses ridden by them on a race-course occupies a box or stand at the head of the track, and by the depression of a flag gives notice to the riders that a start may be made.

The rules governing races that are fairly conducted require that no start is to be made unless the race-horses are accurately lined on the scratch or start line, which is at a point opposite the starter's box, the latter being at one side of the race-track at its head or starting-point.

In order to get up speed or take a flying start, the horses are started for trial at a point somewhat distant from the scratch-line and are ridden toward the starter, who keeps his flag elevated until the horses are lined on the scratch, he being in position to view their heads when the animals cross the scratch-line, and if all the horses are fairly aligned across the track the starter drops his flag and the race commences.

It is a rather difficult task to prevent an unfair start, and as the jockeys are intent on getting the lead if possible and may not see the flag if it is held upright false starts are liable to be made.

In order to arrest the horses and riders before passing the first quarter-post, a second official is stationed on the track at a predetermined distance from the starter's box, the duty of the second official being to warn the riders that a false start has been made and turn them back for another trial. There may be several false starts made before a race is fairly stated, which has a tendency to worry the horses and partly tire them before the race commences.

The object of this invention is to provide a practical device for the use of the race-starter which will afford a visible barrier across the race-track until removed by the starter, which is done instantly when a fair start is had, so that the riders of horses on the track as they pass the starter's stand can see the barrier ahead of them, and if it is not moved will be warned to stop, which they can do before reaching the barrier, which is in the form of a gate hung so as to rock across the track.

The invention consists in the construction and combination of parts as is hereinafter described, and indicated in the claims.

Reference is to be had to the accompanying drawings, forming a part of this specification, in which similar figures of reference indicate corresponding parts in all the views.

Figure 1 is a side view of the improved device at the head of a track adjusted to restrain horses that approach it after passing the starter's box, which is represented in advance of the barrier or gate. Fig. 2 is a transverse sectional view on the line 2 2 in Fig. 1. Fig. 3 is a partly-sectional plan view on the line 3 3 in Fig. 1. Fig. 4 is an enlarged front view of a portion of the device, viewed in the direction of the arrow 4 in Fig. 1. Fig. 5 is a side view of the apparatus represented in Fig. 1 with the barrier in elevated adjustment. Fig. 6 is a sectional plan view of the gate-supports and the barrier in closed adjustment, the section being taken substantially on the line 6 6 in Fig. 1; and Fig. 7 is an enlarged front view of a portion of the gate or barrier slightly modified in construction.

For the proper support of the barrier two pairs of posts 10 10$^a$ are vertically erected, one pair at each side of the race-track, the track being guarded at each side by the parallel fences 11, and preferably the posts are placed at equal distances apart outside of the fences. At a correct distance in advance of the front pair of posts 10 the starter's box or inclosed stand 12 is placed outside of the fence at one side of the track, as is clearly indicated in Fig. 6. The gate or transverse barrier 13 is preferably formed of strong canvas, but may be made of any other available material having pliability and necessary strength.

The gate 13 may be formed of imperforate material or have series of spaced and marginally-strengthened perforations $13^a$ produced in it, as shown in Fig. 7; but it is deemed essential that the gate, if formed of textile material, be strengthened with a rope-binding $13^b$ and also with intermediate ropes, $13^c$, as shown.

The length of the gate 13 is so proportioned that a space will be afforded at each end between said ends and the pair of front posts 10 whereon the gate is hung. Different means may be provided to hang the gate on its supports in a taut condition; but the device represented in the drawings is effective and may be employed advantageously, it being constructed as follows: Two similar plate-like arms 14 are provided, each having a furcated head portion $14^a$, these heads being pivoted in forked brackets 15, which are secured oppositely on the front posts, 10, at a suitable distance from the ground. The pintle-bolts $15^a$, which loosely secure the furcated heads of the arms 14 to the bracket-frames 15, are encircled by coiled springs 16, the ends of which springs extend oppositely and have engagement with the arms and bracket-frames, respectively, so that the torsional force of the springs will be exerted to lift the arms, the construction of parts that have just been described being clearly shown in Fig. 4.

The ropes $13^c$, which extend longitudinally on the pliable gate 13 at suitable distances apart, each have ring-eyes $13^d$ on their ends, which eyes are adapted to receive hooks $14^b$ that are laterally projected from the arms 14, and such a proportion of parts is had that when the hooks and eyes are interlocked the gate 13 will be stretched taut across the space between the posts that afford support for said gate or barrier.

It will be evident that the spring-pressed arms 14 must be drawn down to dispose the gate 13 in closed adjustment, and as a means for drawing the arms and gate into the position shown in Fig. 1 two similar winches 16 are preferably utilized, although other means may be employed for such a purpose.

The winches 16 are attached on the rear posts, $10^a$, so as to project their drums forwardly, and from each winch-drum a chain or rope $16^a$ is extended, so as to have one end attached to a lateral arm $13^e$, the said arms being oppositely and outwardly projected from the lower edge of the gate 13, each arm being of a length that will extend slightly beyond the outer side of the front post to which it is nearest. The other extremity of each rope $16^a$ is fastened to the winch-drum which it is to be wrapped upon in service, so that the winches, which are of ordinary construction, will be adapted to rock the gate down to a closed position after it has been upwardly projected.

In order detachably to secure the gate 13 in depressed adjustment, two latch-bars 17 are provided, which are pivoted on the front posts, 10, nearly opposite the winches 16, said latch-bars having hooks on their rear ends, which will engage with the lower edges of the arms $13^e$, as represented in Figs. 1 and 6. The front ends of the latch-bars 17 have a pivoted connection with the lower ends of two upright connecting-rods 18, which are in a like manner attached to the outer ends of two tripping-arms 19, the latter being secured at their other ends on the rock-shaft 20, which is supported to rock on the upper part of each front post, 10.

The tripping-arms 19 are placed on the portions of the rock-shaft 20 which are extended beyond the outer sides of the front posts, so that the latch-bars 17 may work freely on the same sides of these posts and avoid interference with the arms 14, as is indicated in Fig. 6, and it being essential that the latch-bars shall engage the arms $13^e$ at the same time a turnbuckle $18^a$ is introduced in each connecting-rod 18 to afford convenient means for accurately adjusting the length of said rods for the purpose mentioned.

On the side of the post 10 that is nearest to the starter's box 12 and directly in its rear a preferably longer rock-arm $20^a$ is secured on the portion of the rock-shaft 20 that is projected laterally from the said post, as is clearly shown in Fig. 2, and on the forward end of this arm a depending pitman-rod 21 is loosely secured. The rod 21 is preferably furnished with a turnbuckle $21^a$ to permit its adjustment for length, and its lower end is pivoted to the end of one limb of the bell-crank 22, which has a jointed support on the front post, 10, at a point directly below the arm $20^a$. The downwardly-extending member of the bell-crank 22 has its lower extremity pivotally secured to the rear end of a pusher-bar 23, projecting forwardly and into the lower portion of the starter's box 12, the front end of said pusher-bar having a pivotal connection with the upright starting-lever 24 at a point a short distance above the lower end of said lever. This lever is pivoted in a bracket-box $24^a$, secured on a solid base embedded in the ground within the starter's box, as shown in Figs. 1, 2 and 5, or the box may be otherwise supported.

As the length of the pusher-bar 23 is such as will require it to receive support between its ends, one or more bracket-stands $23^a$ are provided for sustaining the bar, which stands are located at proper points on the ground and have a loose engagement with the bar.

The lever 24 passes loosely through a slot formed to receive it in the floor $12^a$ of the starter's box, whereby said lever may be conveniently manipulated by the starter, so as to rock it toward or from the front posts, 10, and it will be seen that from the construction and arrangement of parts the forward rocking movement of the starting-lever indicated in Fig. 5 will rock the rear ends of the latch-bars down, and thus detach the hook ends of said bars from the arms 13° for a release of the gate 13.

On the upper portion of the starting-lever 24 a flagstaff $24^b$ is jointed, said staff, which is comparatively short, having a flag $24^c$ secured by one edge on it, so that when the staff and lever are in alignment, as shown in Fig. 1, the flag will be elevated and plainly displayed.

The rearward rocking movement of the lever 24 serves to elevate the hook ends of the latch-bars 17 for an interlocking engagement of the said hooks with the arms 13°, which is effected by the downward movement of said arms when drawn by the ropes $16^a$, as before explained.

To afford necessary support for the winch-ropes $16^a$, there is a loose pulley $16^b$, pivoted on the outer side of each of two similar bracket-plates $16^c$, the latter being looped to clear the latch-bars 17, and having their end portions attached to the outer sides of the posts 10.

When the gate 13 is to be depressed, the ropes $16^a$ are sufficiently slackened or unwound from the winch-drums to permit said ropes to be placed over the grooved loose pulleys $16^b$, as indicated in Fig. 1, which arrangement will afford a proper purchase for the ropes when drawing the gate into latched adjustment. After the gate is latched, as stated, the ropes $16^a$ may be removed from the pulleys $16^b$, so as to permit the free ascent of the gate.

It is essential that the quick and reliable elevation of the gate 13 be provided for, and, as it is possible that the springs 16 may fail to throw up the gate, it is preferred to provide weights also to assist the springs and render the upward movement of the gate instantaneous as soon as it is released.

The supplementary weights 25 are furnished for the purpose of aiding the springs 16 and are fastened to the ends of two flexible connections 26, which have their opposite ends secured to the arms 13°. The weights are preferably located in projecting boxes $10^c$, which are secured on the rear faces of the posts $10^a$, and said boxes, which extend nearly the height of the posts, have doors $10^d$ provided to allow free access to the weights.

The ropes or other flexible connections 26 are supported on loose pulleys $10^e$ bracketed on the upper portions of the posts $10^a$, substantially as shown in Figs. 1 and 5, and the ropes pass through the posts to enter the boxes, suitable apertures being made in the posts $10^a$ to permit their free movement through the latter.

The apparatus which has been described is put in service as follows: The gate 13 is latched in depressed condition, as shown in Fig. 1, which will cause an elevation of the weights 25 and a torsional strain on the springs 16, the lever 24 then assuming a rearward inclination and the flag $24^c$ being then elevated for its prominent display. The starter occupies the box or stand 12 and the jockeys start their horses at a proper point in advance of the starter to get up speed when passing the scratch-line 11. (Shown in Fig. 6.) If the horses all align their noses above the scratch-line when said imaginary line is reached, the starter instantly shifts the lever 24 into the position shown in Fig. 5, which will release the gate 13, and it will at once rise, so as to clear the track, this occurring in plain sight of the riders of the horses, who can readily observe the gate without looking sidewise, and for the notification of all interested in the race the starter rocks the flag into a pendent position when he shifts the lever which supports the flag. In case the riders of the horses make a false start, the gate 13 is allowed to remain in a depressed condition, which will bar the passage of the horses, and the riders must return to the starting-point for a fresh start.

It will be seen that the improvement is reliable and enables the starter to control the starting of all horses and their jockeys without requiring the services of an additional official to stop the horses, so that the expense of a horse-stopper is dispensed with and the worry of horses in running some distance before they are stopped is obviated.

Having thus described my invention, I claim as new and desire to secure by Letters Patent—

1. In a horse-starting apparatus for race-tracks, the combination with supports at opposite sides of the track, of a gate having its end bars pivoted at one end to the supports so as to swing down between the said supports, springs for normally holding the gate swung up, latches for holding the gate depressed between the supports, and means for releasing the latches, substantially as described.

2. In a horse-starting apparatus for race-tracks, the combination with supports at opposite sides of the track, of a pivoted and spring-actuated gate, said gate having its end bars pivoted to the supports to permit the gate to swing down between the said supports, pivoted latches engaging the gate to hold it depressed, an operating-lever, and mechanism between the latches and lever for operating the former from the latter, substantially as described.

3. In a horse-starting apparatus for race-tracks, the combination with supports on opposite sides of the track, of a pivoted and spring-actuated gate carried by the supports, pivoted latches engaging the gate to hold it depressed, a rock-shaft, a connection between the rock-shaft and latches, and means for operating the rock-shaft, substantially as described.

4. In a horse-starting apparatus for race-tracks, the combination with supports on opposite sides of the track, of a pivoted and spring-actuated gate carried by the supports, latches engaging the gate to hold it depressed, a rock-shaft, connections between the rock-shaft and latches, an operating-lever, and a connection between the lever and rock-shaft, substantially as described.

5. In a horse-starting apparatus for race-tracks, the combination with supports on opposite sides of the track, of a pivoted and spring-actuated gate carried by the supports, latches for holding the gate depressed, means for releasing the latches from the gate, and a weight connected by means of a flexible connection to the gate, substantially as described.

6. In a horse-starting apparatus, the combination with opposite upright posts on a race-track near its head, of a pliable gate having hanger-arms pivoted on the posts, springs arranged to press the arms and gate upwardly, a latching device adapted to detachably retain the gate depressed, a gate-releasing device operative by the horse-starter, and means for depressing the gate for its latching adjustment, substantially as described.

7. In a horse-starting apparatus, the combination with two pairs of upright posts arranged at the sides of a race-track near its head, a pliable gate pivoted on said posts, arms detachably secured to the gate and pivoted on the front pair of posts, and torsion-springs adapted to elevate the gate, of a gate-latching device arranged to detachably retain the gate in depressed position, a releasing mechanism for the latching device, operative by the horse-starter, and a gate-depressing mechanism on the rear pair of posts, substantially as described.

8. In a horse-starting apparatus for race-tracks, the combination with supports, and a spring-actuated gate pivoted to the supports, of a windlass, a rope or chain on the windlass and connected with the chain, and a pulley on one of the supports and over which the chain or rope is adapted to be passed, substantially as described.

9. In an apparatus for starting race-horses, a gate formed of end bars and textile material strengthened by a rope binding and intermediate ropes extending across the same, the ends of the ropes being connected to the end bars, substantially as described.

PATRICK RYAN.

Witnesses:
JNO. M. RITTER,
WM. P. PATTON.